United States Patent
Kawai

(10) Patent No.: US 7,847,990 B2
(45) Date of Patent: Dec. 7, 2010

(54) METHOD, SYSTEM, AND APPARATUS FOR COMPOSITE PRINTING, AND COMPUTER USABLE MEDIUM THEREFOR

(75) Inventor: Sunao Kawai, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 279 days.

(21) Appl. No.: 11/956,778

(22) Filed: Dec. 14, 2007

(65) Prior Publication Data

US 2008/0144096 A1 Jun. 19, 2008

(30) Foreign Application Priority Data

Dec. 15, 2006 (JP) ............... 2006-338077

(51) Int. Cl.
*H04N 1/46* (2006.01)
*G06F 3/12* (2006.01)
*G06K 15/00* (2006.01)
*G06K 9/40* (2006.01)

(52) U.S. Cl. ............ 358/540; 358/1.13; 358/1.18; 358/1.2; 358/3.28; 382/254; 382/260; 382/284; 382/289; 382/291; 382/295; 382/296; 345/629

(58) Field of Classification Search ......... 358/540, 358/1.13, 1.18, 1.2, 478, 474, 477, 471, 3.28; 382/284, 254, 260, 289, 291, 295, 296, 305; 345/629, 661, 473, 474; 348/32, 239
See application file for complete search history.

(56) References Cited

U.S. PATENT DOCUMENTS 7,330,281 B2 * 2/2008 Ferlitsch ............... 358/1.13
2007/0019809 A1 * 1/2007 Song et al. ............. 380/55

FOREIGN PATENT DOCUMENTS

JP 07-336523 12/1995

* cited by examiner

*Primary Examiner*—Charlotte M Baker
(74) *Attorney, Agent, or Firm*—Banner & Witcoff, Ltd

(57) ABSTRACT

There is provided a method to print a composite image, by using a data processing apparatus, capable of generating first data, and an image forming apparatus, capable of generating second data and forming the composite image. The method includes providing one of a print instruction and a composition instruction to the data processing apparatus, setting a configuration of the second data, providing the one of the printing instruction and the composition instruction along with the first data to the image forming apparatus, reading and storing the second image, composing third data by combining the first data with the second data, judging whether the composition instruction is provided, pausing the printing operation when the composition instruction is provided, controlling reading the second image when the printing operation is paused, controlling the composition of the third data when the composition instruction is provided, and controlling forming the composite image.

17 Claims, 8 Drawing Sheets

METHOD, SYSTEM, AND APPARATUS FOR COMPOSITE PRINTING, AND COMPUTER USABLE MEDIUM THEREFOR

CROSS REFERENCE TO RELATED APPLICATION

This application claims priority from Japanese Patent Application NO. 2006-338077, filed on Dec. 15, 2006, the entire subject matter of which is incorporated herein by reference.

BACKGROUND

1. Technical Field

Aspects of the present invention relate to a method, a system, and an apparatus capable of forming a composite image, in which one image is combined with another image. Another aspects of the present invention relate to a computer usable medium in the method, the system, and the apparatus for forming such a composite image.

2. Related Art

Conventionally, a method to form a composite image on a recording medium by using a printing apparatus with a scanning unit has been known. Image data representing an image (first image data), passed from an external device to the printing apparatus, is combined with another image data (second image data) obtained through the scanning unit and output as a combined image on a recording medium, such as a sheet of paper. In this method, the second image data obtained through the scanner unit is temporarily stored in a data storage so that the second image data being stored is combined with the first image data upon an instruction from the external device.

In another configuration, an operation to scan an objective image is conducted in synchronization with an outputting operation (i.e., a printing operation) so that the second image data obtained through the scanner unit is combined with the first image data to be output as a composite image. The latter configuration is disclosed in Japanese Patent Provisional Publication HEI7-326523, for example.

In the latter configuration disclosed in the above-referenced publication, it is suggested that, in order for the second image data representing the scanned image to be combined into the first image data in a desired position, the user is required to configure the first image data to have an indication for the position of the scanned image prior to the printing operation.

SUMMARY

In view of the above, the present invention is advantageous in that a method, a system, and an apparatus for printing, and a computer usable medium therefor, in which composite printing can be conducted easily and efficiently, are provided. Further, the method, the system, and the apparatus are advantageous in that the scanned image is modifiable in the combined image upon composition.

According to an aspect of the invention, there is provided a method to print a composite image in which a first image represented by first data and a second image formed on a recording medium are combined, by using a data processing apparatus, capable of generating the first data, and an image forming apparatus, capable of generating the second data which represents the second image and forming the composite image on a recording medium. The method includes providing one of a print instruction concerning a printing operation for the first image and a composition instruction concerning composition of the composite image to the data processing apparatus, setting a configuration of the second data to be combined with the first data to compose the composite image, providing the one of the printing instruction and the composition instruction along with the first data to the image forming apparatus, reading the second image formed on the recording medium to generate the second data, storing the generated second image, composing third data representing the composite image by combining the first data with the second data, judging as to whether the composition instruction is provided along with the first data, pausing the printing operation for the first data when it is judged that the composition instruction is provided along with the first data, controlling reading the second image to generate the second data when the printing operation for the first image is paused controlling the composition of the third data when it is judged that the composition instruction is provided along with the first data, and controlling forming the composite image according to the third data when the third data is composed.

According to another aspect of the invention, there is provided a printing system capable of printing a composite image in which a first image represented by first data and a second image formed on a recording medium are combined, comprising a data processing apparatus, capable of generating the first data, and an image forming apparatus, capable of generating the second data which represents the second image and forming the composite image on a recording medium. The data processing apparatus includes a print instruction system to provide one of a print instruction concerning a printing operation for the first image and a composition instruction concerning composition of the composite image to the data processing apparatus, a composite image setting system to set a configuration of the second data to be combined with the first data to compose the composite image, and a data providing system to provide the one of the printing instruction and the composition instruction along with the first data to the image forming apparatus. The image forming apparatus includes a printing unit to form an image on a recording medium, a reader unit to read the second image formed on the recording medium to generate the second data, a storage unit to store the second image generated in the reader unit, a receiving system to receive the one of the print instruction and the composition instruction along with the first data provided from the data processing apparatus, a composing system to compose third data representing the composite image by combining the first data with the second data, a judging system to judge as to whether the composition instruction is received along with the first data by the receiving system, a pausing system to pause the printing operation for the first data when the judging system judges that the composition instruction is received along with the first data by the receiving system, a reader unit controlling system to control the reader unit to read the second image to generate the second data when the printing operation for the first image is paused by the pausing system, a composition controlling system to control the composition of the third data when the judging system judges that the composition instruction is received along with the first data by the receiving system, a print controlling system to control the printing unit to form the composite image according to the third data when the composing system composes the third data.

According to another aspect of the invention, there is provided an image forming apparatus capable of printing a composite image in which a first image represented by first data, generated in an external data processing apparatus, and a second image formed on a recording medium are combined. The image forming apparatus includes a printing unit to form an image on a recording medium, a reader unit to read the second image formed on the recording medium to generate the second data, a storage unit to store the second image generated in the reader unit, a receiving system to receive one of the print instruction and the composition instruction along with the first data provided from the external data processing apparatus, a composing system to compose third data representing the composite image by combining the first data with the second data, a judging system to judge as to whether the composition instruction is received along with the first data by the receiving system, a pausing system to pause a printing operation for the first data when the judging system judges that the composition instruction is received along with the first data by the receiving system, a reader unit controlling system to control the reader unit to read the second image to generate the second data when the printing operation for the first image is paused by the pausing system, a composition controlling system to control the composition of the third data when the judging system judges that the composition instruction is received along with the first data by the receiving system, and a print controlling system to control the printing unit to form the composite image according to the third data when the composing system composes the third data.

According to another aspect of the invention, there is provided a computer usable medium including computer readable instructions to control an information processing apparatus, which is capable of providing a print instruction to a printing apparatus. The printing apparatus is capable of printing a first image represented by first data and generating a composite data to print a composite image based on the first data and second data being generated by reading a second image through a reading unit. The computer readable instructions control the information processing apparatus to execute steps of issuing the print instruction to print the first data, selectively appending a composite print information to the print instruction when the print instruction is issued, the composite print information including information concerning the second data to be combined with the first data to form the composite image, and controlling transmission of the print instruction to the printing apparatus so that the print instruction including the appended composite print information is transmitted through a transmission unit of the information processing apparatus to the printing apparatus when the composite print information is appended to the print instruction, whilst the print instruction is transmitted through the transmission unit of the information apparatus to the printing apparatus without the composite printing information when appending the composite print information is omitted.

According to the above configurations, the composition instruction can be provided to the printing system when a printing operation for the first data is designated through the data processing apparatus. Therefore, the composite image can be achieved easily in a simple manner.

BRIEF DESCRIPTION OF THE
ACCOMPANYING DRAWINGS

FIG. 3 is an illustrative view of an image generated in the PC according to the embodiment of the present invention.

DETAILED DESCRIPTION

Hereinafter, an embodiment according to aspects of the present invention will be described with reference to the accompanying drawings.

Figure 1:
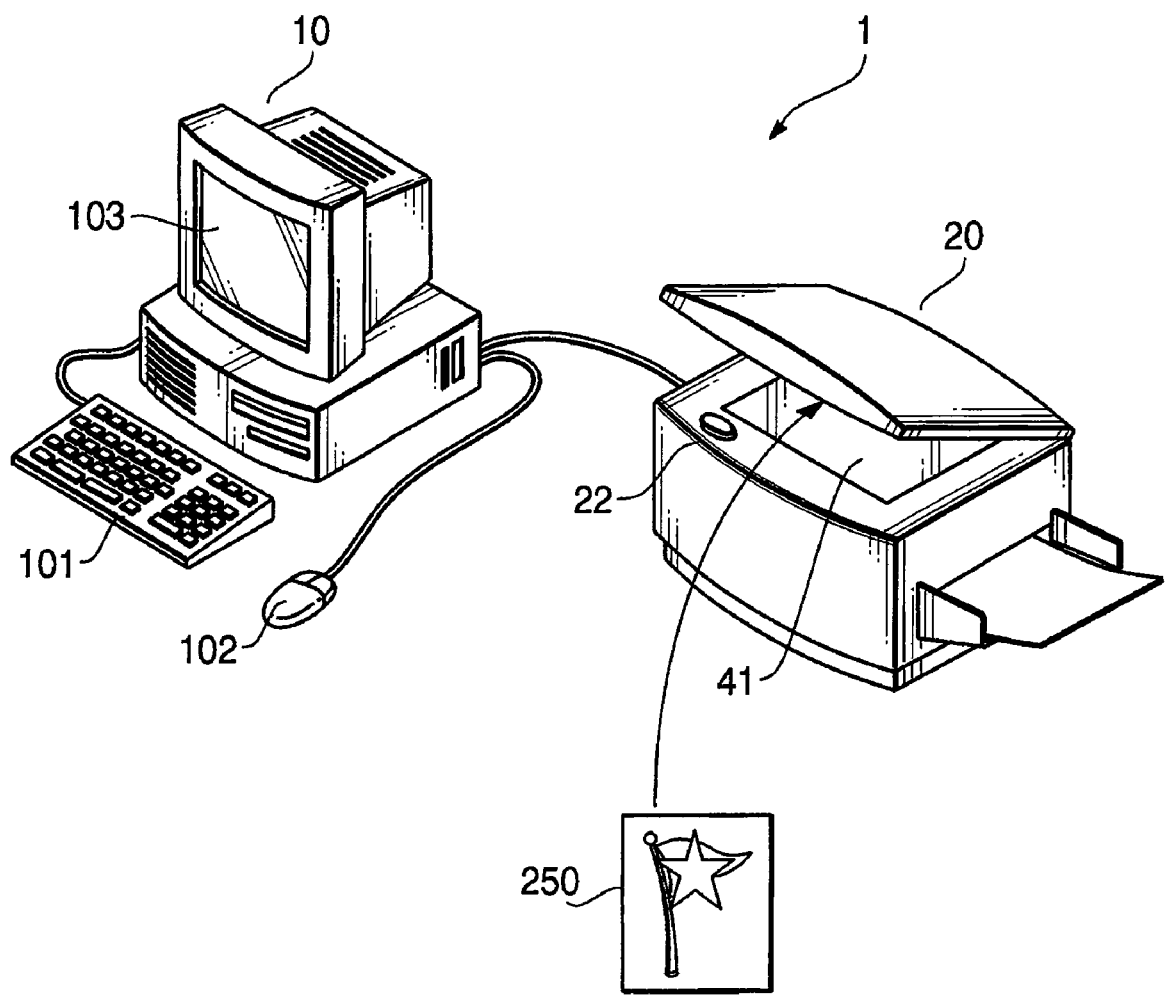
FIG. 1 is a schematic diagram to illustrate a printing system according to an embodiment of the present invention.
Figure 2:
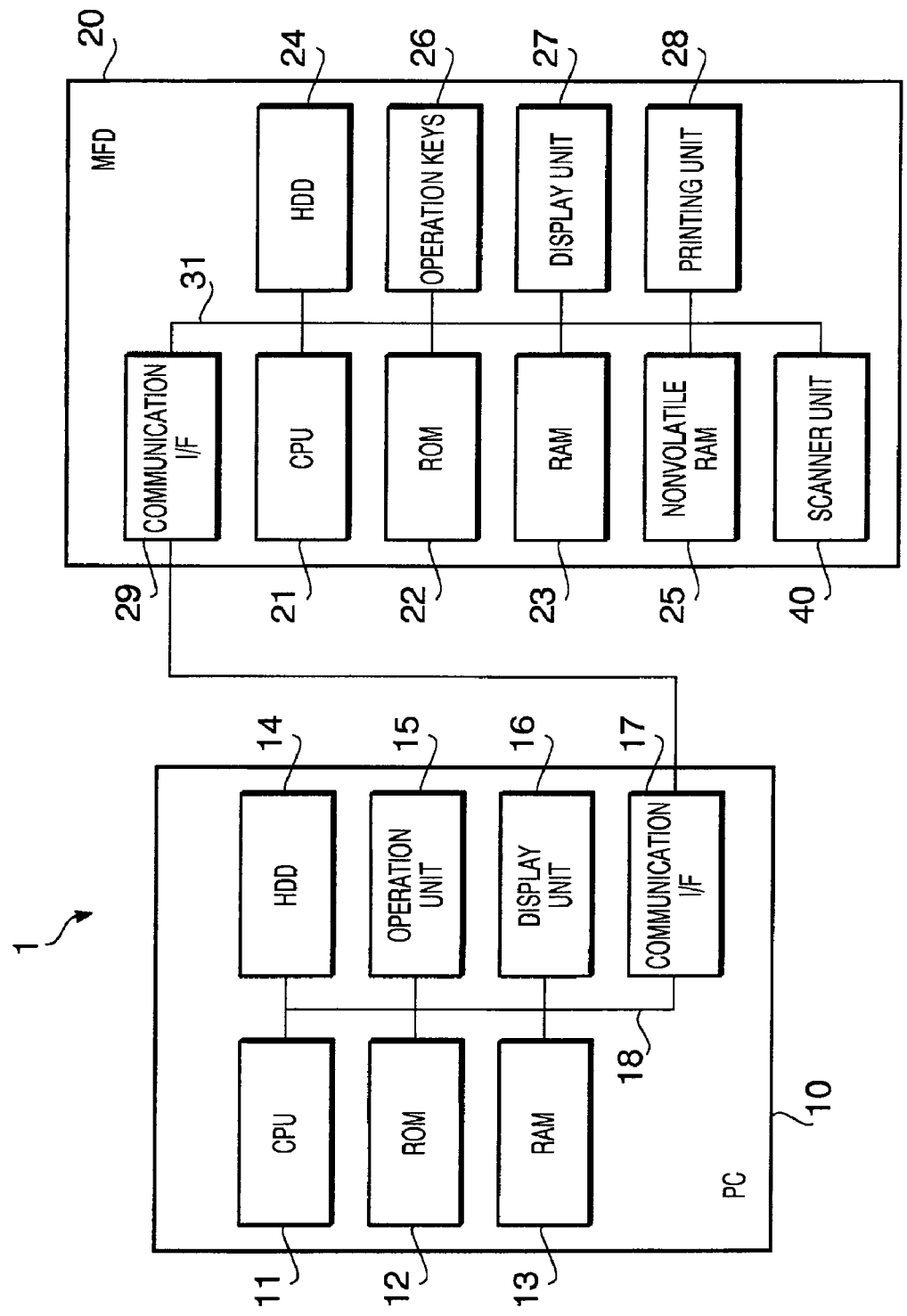
FIG. 2 is a block diagram to illustrate a configuration of the printing system according to the embodiment of the present invention.

FIG. 1 is a schematic diagram to illustrate a printing system 1 according to an embodiment of the present invention. The printing system 1 includes a PC (personal computer) 10 and an MFD (multi-function device 20.) FIG. 2 is a block diagram to illustrate a configuration of the printing system 1 according to the embodiment of the present invention. The PC 10 includes a CPU 11, a ROM 12, a RAM 13, an HDD 14, an operation unit 15, a display unit 16, and a communication I/F (interface) 17. The above components are connected with one another through a bus 18.

The CPU 11 controls operations of the PC 10 according to various programs, which are stored in storages (i.e., the ROM 12, the RAM 13, and the HDD 14.) The operation unit 15 includes, for example, a keyboard 101 and a mouse 102, through which a user inputs various instruction regarding operations in the PC 10 and the printing system 1. The display unit 16 includes, for example, an LCD (liquid crystal display) 103 to display various information to present to the user. The communication I/F 17 is an interface through which connection with the MFD 20 is provided.

The MFD 20 includes a CPU 21, a ROM 22, a RAM 23, an HDD 24, operation keys 26, a display unit 27, a communication I/F 29, a scanner unit 40, and a printing unit 28. The above components are connected with one another through a bus 31.

The CPU 21 controls operations of the MFD 20 according to various programs, which are stored in storages (i.e., the ROM 22, the RAM 23, and the HDD 24.) The operation keys 15 include, for example, various buttons, through which the user inputs instruction regarding operations in the MFD 20. The display unit 27 includes, for example, an LCD (liquid crystal display) panel to display various information to present to the user. The communication I/F 29 is an interface through which connection with the PC 10 is provided. The scanner unit 40 reads an image formed on a recording medium and generates image data representing the read image. The printing unit 28 functions to form an image according to image data obtained through various sources such as the scanner unit 40 and the PC 10.

The PC 10 and the MFD 20 can be connected with each other in wires and/or wirelessly either directly on one-to-one basis or indirectly through a network such as a LAN. Through the connection, the PC 10 can control the MFD 20 so that data generated in the PC 10 is transmitted to the MFD 20 to be printed by the printing unit 28. The PC 10 is provided with an application program to generate image data and stores the application program in the storage such as the HDD 14. Further, a driver program (hereinafter referred to as a "printer driver") to convert the generated image data into printable data is stored in the HDD 14 of the PC 10. Thus, operations of the printing system 1 to compose a combined image are performed in cooperation with the PC 10 and the MFD 20.

FIG. 3 is an illustrative view of an image 200 generated in the PC 10 according to the embodiment of the present invention. In the present embodiment, image data representing the image 200 shown in FIG. 3 being stored in the PC 10 is combined with a scanned image 250 (see FIG. 1) obtained through the scanner unit 40 of the MFD 20.

Figure 4:
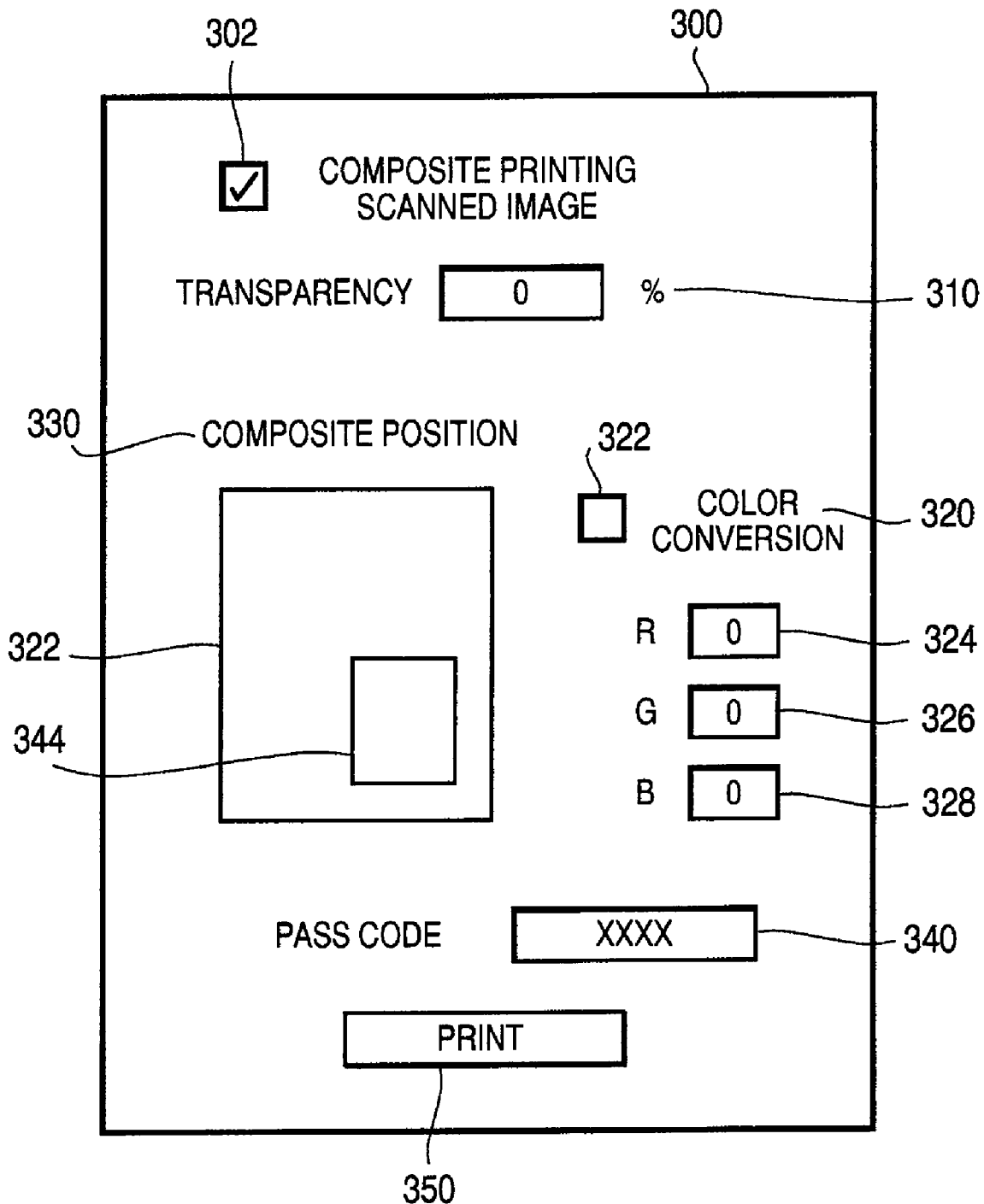
FIG. 4 illustrates a user I/F window to be displayed to a user to enter print settings for composite printing according to the embodiment of the present invention.
Figure 5:
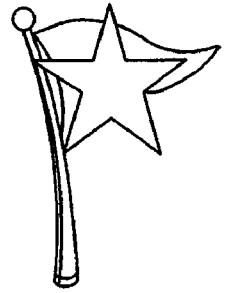
FIG. 5 is an illustrative view of a composite image according to the embodiment of the present invention.

FIG. 4 illustrates a user I/F window 300 to be displayed to the user to enter print settings for composite printing process, which will be described later in detail, according to the embodiment of the present invention. The user I/F window 300 is displayed on the LCD 103 in S500 (see FIG. 6) of the composite printing process.

The user I/F window 300 includes a checkbox 302 for composition instruction, a transparency field 310, a position indication box 332, a checkbox 322 for color conversion, a passcode field 340, and a print instruction button 350.

The checkbox 302 is provided for composition instruction, and a checkmark can be placed by the user as an instruction to the PC 10 to execute the composite printing process. The user may use the mouse 102 to place a checkmark on the checkbox 302.

In the transparency field 310, the user can enter a desired value for transparency of the image 250 to be combined with the image 200. More specifically, transparency of the image 250 to be superimposed over the image 200 (i.e., visibility of the image 200 under the image 250) can be specified in percentage. For example, when the transparency is 0%, the image 250 is completely opaque, and the image 200 at a portion on which the image 250 is superimposed is invisible. Meanwhile, when the transparency is 100%, the image 250 is completely transparent (invisible), and the image 200 is visible as originally generated. Therefore, in the present embodiment, the transparency can be specified in a range from 1% to 99%. It is noted that in this range, the image 200 to be superimposed by the image 250 and the image 250 to be superimposed on the image 200 can maintain their minimal visibilities.

In the checkbox 322 for color conversion, the user can place a checkmark by using the mouse 102 when intensities of color components R, C, B (i.e., red, green, and blue) are modified. In the present embodiment, color conversion fields 324, 326, 328 are provided for the user to specify the color intensities for R, G, B respectively within a range from 0% to 100%.

For example, when the intensity of R is specified to be 20%, an original color intensity of R in the image 250 obtained through the scanner unit 20 is reduced to 20%. When the intensities of R, A B are specified to be 50% respectively, original color intensities of R, G, B in the image 250 obtained through the scanner unit 20 are reduced to 50%. When the intensity of the color component is specified to be 100%, an original color intensity of the color component is maintained. In FIG. 4, no checkmark is placed in the checkbox 322, therefore, the color conversion is not applied to any of the color components. It is noted that entry in the color conversion fields 324, 326, 328 is acceptable exclusively when a checkmark is placed in the checkbox 322 for color conversion in the user I/F window 300. In this configuration, unnecessary input to the color conversion fields 324, 326, 328, which may otherwise unnecessarily processed during the composite printing process, can be prevented.

The position indication box 332 is provided to input a position of the image 250 to be arranged with respect to the image 200 when the composite printing is conducted. In the present embodiment, a frame (i.e., outline) of the image 200 is indicated by the position indication box 332, and a position in which the image 250 is to be arranged with respect to the image 200 is indicated by a rectangular area 334. The rectangular area 334 can be arbitrarily moved by an operation to the mouse 102. In FIG. 4, the rectangular area 334 is arranged in a lower left position in the position indication box 332. Therefore, the image 250 will be formed in a corresponding lower left position of the image 200 when the composite printing is completed.

Figure 7:
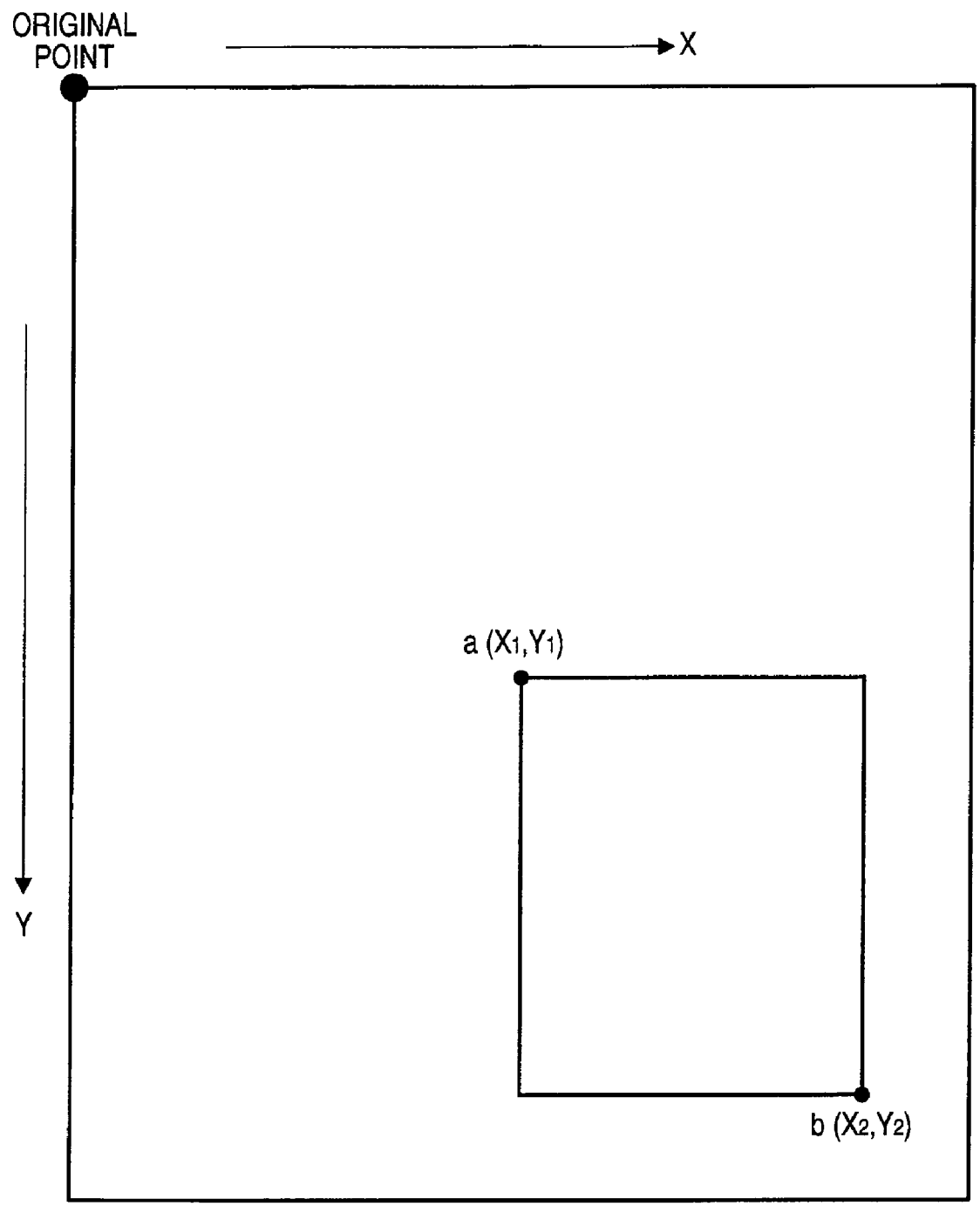
FIG. 7 illustrates a method to specify a position of an image 250 with respect to an image 200 according to the embodiment of the present invention.

More specifically, the position of the image 250 indicated by the rectangular area 334 can be specified by coordinates of the position indication box 332. FIG. 7 illustrates a method to specify the position of the image 250 with respect to the image 200 according to the embodiment of the present invention. In the present embodiment, an upper left corner of the position indicating box 332, which represents the frame of the image 200, is set to be the original point of the coordinate system, and coordinates of diagonal corners a, b of the rectangular area 334 are represented as (x1, y1) and (x2, y2) respectively. The user operates the mouse 102 to a relative size of the image 250 and to move the rectangular area 334 in a desired position. Thus, the coordinates (x1, y1), (x2, y2) of the corners a, b indicating the relative size and position of the image 250 are obtained.

The passcode field 340 is provided for the user to enter a passcode, which enables printable data to be securely printed in the composite printing process. For example, when a plurality of pieces of printable data are passed to the MFD 20 for the composite printing process, the pieces of printable data stored in the MFD 20 can be identified by the passcode.

More specifically, when a passcode is entered in the MFD 20 through the operation keys 26 during the composite printing process (in S712 in FIG. 8, which will be described later), the printable data stored in association with a passcode, which is identical to the passcode entered in S712, is used for composite printing to be combined with the scanned image. In the present embodiment, a passcode is four-digit numbers, however, the passcode may include arbitrary alphabets, signs, and characters.

With the above configuration to use the passcode to identify the printable data, for example, when the PC 10 is located away from the MFD 20 and the user cannot move to the MFD 20 to start composite printing immediately, it can prevent a third image from being accidentally or maliciously combined with the image 200 by another user.

The print instruction button 350 is provided for the user to instruct a printing operation to the MFD 20 when printable data is passed to the MFD 20 to be printed. Specifically, when the print instruction 350 is pressed, the image data generated in an application program in the PC 10 is passed to the printer driver and rasterized. The rasterized data, i.e., the printable data, is transmitted to the MFD 20 along with the print settings, which are specified in the user I/F window 300, as a print job.

The MFD 20 receiving the print job executes a printing operation to combine the image 250 with the image 200 in accordance with the print settings as set in the user I/F window 300. The printing operation for the composite printing will be described later in detail.

Figure 6:
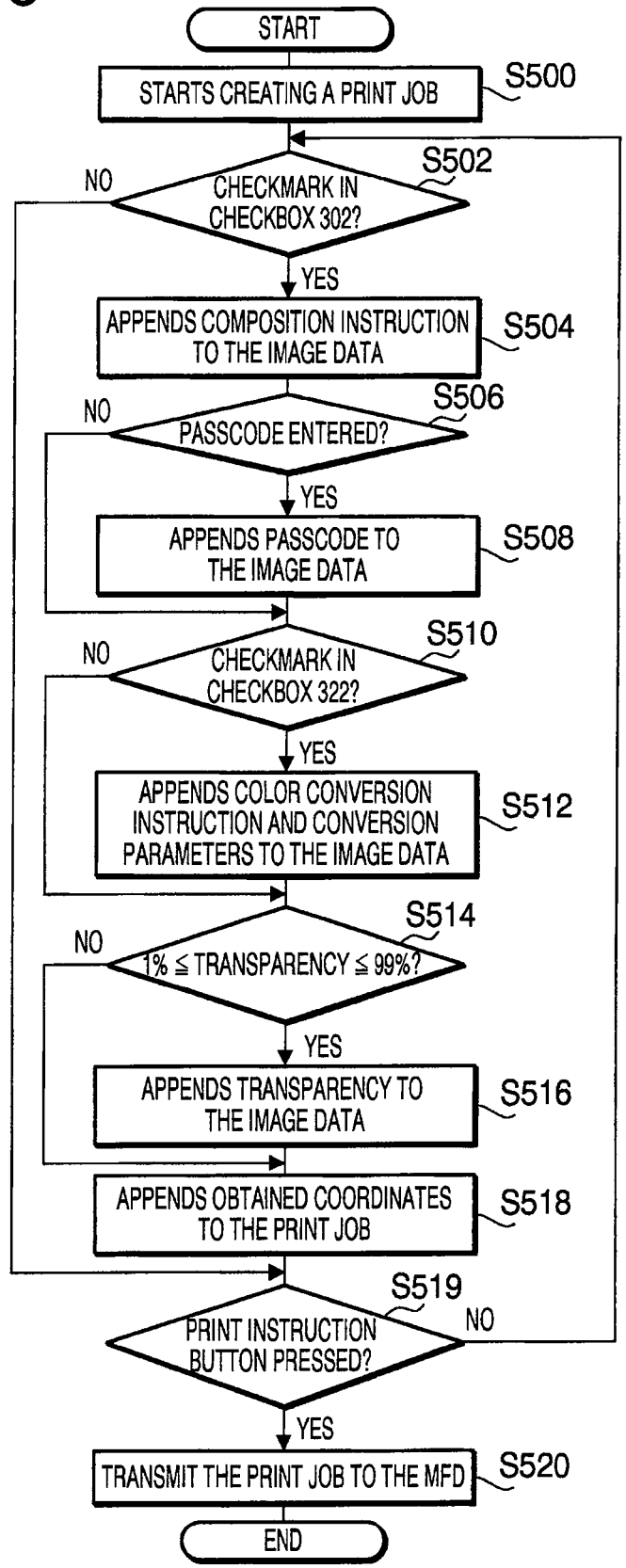
FIG. 6 is a flowchart to illustrate a composite printing process according conducted by a PC according to the embodiment of the present invention.

FIG. 6 is a flowchart to illustrate the composite printing process to be conducted by the PC 10 (i.e., the CPU 11, the ROM 12, the RAM 13) according to the embodiment of the present invention. The process starts when image data of the image 200 is generated in an application program in the PC 10, and an instruction from the user to start printing is given to the PC 10.

When the composite printing process starts, in S500, the PC 10 starts creating a print job in accordance with the instruction. Specifically, the user I/F window 300 is displayed on the LCD 103 to prompt the user to enter the print settings.

In S502, the PC 10 judges as to whether a checkmark is placed in the checkbox 302 for composite printing in the user I/F window 300. If it is judged a checkmark is placed (S502: YES), in S504, the PC 10 appends an instruction for composition to the image data. In S502, if it is judged that no checkmark is placed in the checkbox 302 (S502: NO), the process proceeds to S519.

In S506, the PC 10 judges as to whether a passcode is entered by the user in the user I/F window 300. If a passcode is entered (S506: YES), in S508, the PC 10 appends the entered passcode to the image data. In S506, if no passcode is entered (S506: NO), the process proceeds to S510.

In S510, the PC 10 judges as to whether a checkmark is placed in the checkbox 322 for color conversion in the user I/F window 300. If it is judged that a checkmark is placed (S501: YES), in S512, the PC 10 appends an instruction for color conversion to the image data. Further, the values entered in the color conversion fields 324, 326, 328 are set as conversion parameters. In S510, if it is judged that no checkmark is placed in the checkbox 322 (S510: NO), the process proceeds to S514.

In S514, the PC 10 judges as to whether the transparency entered by the user in the transparency field 310 in the user I/F window 300 is in the range from 1% to 99%. If it is judged that the transparency is in the range from 1% to 99% (S514: YES), in S516, the PC 10 appends the value as a transparency parameter to the image data. In S514, if the transparency entered in the transparency field 310 is 0% (S514: NO), the process proceeds to S518. If no value is entered in the transparency field 310, it is judged that the transparency is substantially 0% (S514: NO), and the image 250, which is entirely opaque, is superimposed over the image 200. Therefore, the image 200 at the portion in which the image 250 is formed is not formed at all.

In S518, the PC 10 obtains the coordinates of the corners a (x1, y1), b (x2, y2), which are entered in the user I/F window 300. The obtained values are appended as position parameters to the image data. The process proceeds to S519.

In S519, it is judged as to whether the print instruction button 350 is pressed by the user. If the print instruction button 350 is not pressed within a predetermined period (S519: NO), the process returns to S502.

In S502, if it is judged that no checkmark is placed in the checkbox 302 (S502: NO), the remaining print settings, which are otherwise set in S508, S512, S516, S518, are not appended to the image data.

In S520, the image data and the print settings set in any of S504, S508, S512, S516, and S518 are transmitted to the MFD 20 as a print job. In S520, however, the image data is rasterized to be printable data in the application program before the transmission to the MFD 20.

Figure 8:
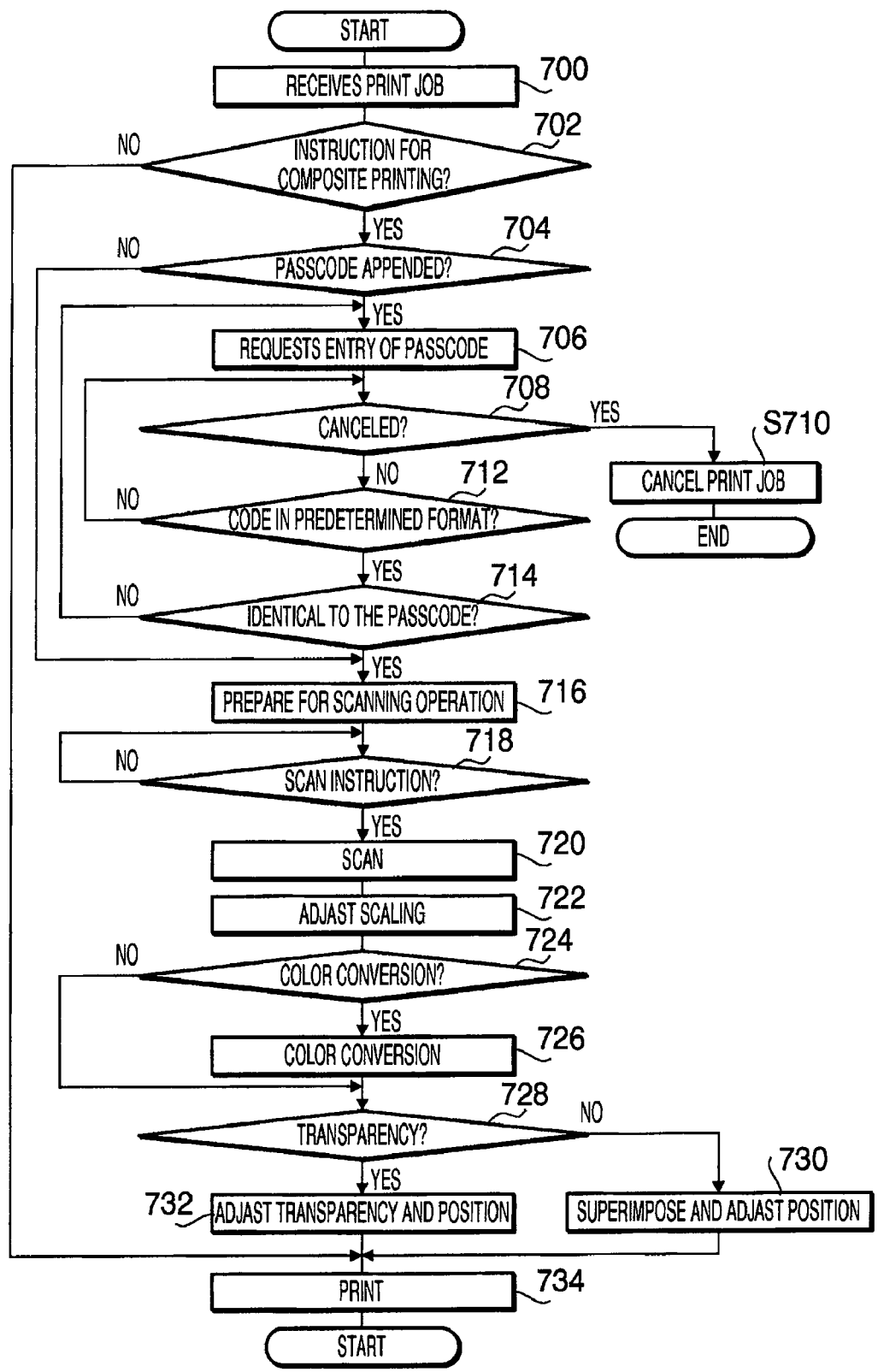
FIG. 8 is a flowchart to illustrate the composite printing process to be conducted by an MFD according to the embodiment of the present invention

Next, the composite printing process to be conducted by the MFD 20 (i.e., the CPU 21, the ROM 22, the RAM 23) will be described. FIG. 8 is a flowchart to illustrate the composite printing process to be conducted by the MFD 20 according to the embodiment of the present invention. The process starts when the print job is transmitted from the PC 10 in S520 (see FIG. 6).

When the process starts, in S700, the MFD 20 receives the print job transmitted from the PC 10. The received print job is temporarily stored in the RAM 23 or one of the other storage units in the MFD 20.

In S702, the MFD 20 judges as to whether an instruction for composite printing is appended in the print job. If it is judged that the instruction (see S504 in FIG. 6) is appended (S702: YES), the process proceeds to S704. If no instruction for composite printing is appended (S702: NO), it is judged that the print job received in S700 merely includes printable data for regular printing, in which no composition is performed. Therefore, in S734, the printable data included in the print job is simply printed without composition.

In S704, the MFD 20 judges as to whether a passcode is appended in the print job. If it is judged that the passcode (see S508 in FIG. 6) is appended (S704: YES), in S706, the MFD 20 displays a message to request the user to enter the passcode on the display panel 27. The MFD 20 waits for the user's input through the operation keys 26. In S704, if it is judged that no passcode is appended in the print job (S704: NO), the process proceeds to S716.

In S708, when an operation is given by the user, the MFD 20 judges as to whether the operation is to cancel the print job. If it is judged that the operation is to cancel the print job (S708: YES), in S710, the MFD 20 cancels the print job and terminates the process. In S708, if it is judged that the operation is not canceling the print job (S708: NO), in S712, the MFD 20 judges as to whether the user's input is a code in a predetermined format (i.e., four-digit numbers in the present embodiment.) If the user's input is not a code in the predetermined format (S712: NO), the process returns to S708. In S712, if it is judged that the user's input is a code in the predetermined format (S712: YES), in S714, the MFD 20 judges as to whether the code entered in S712 is identical to the passcode appended in the print job. In S714, if it is judged that the code entered in S712 is identical to the passcode appended to the print job (S714: YES), the process proceeds to S716.

In S716, the MFD 20 displays a message to request the user to prepare for a scanning operation so that the image 250 can be scanned by the scanner unit 40 to be combined with the image 200, which is included in the print job as the printable data. In response to the message, the user may place the image 250 on a flatbed 41 (see FIG. 1) to be read by the scanner unit 40. Meanwhile, the MFD 20 waits for the user's instruction to start scanning.

In S718, the MFD 20 judges as to whether the instruction to start a scanning operation is given by the user through the operation keys 26. If the instruction is not given (S718: NO), S718 is repeated. If the instruction to start the scanning operation is given (S718: YES), in S720, the MFD 20 drives the scanner unit 40 to scan the image 250 and generates scanned data based on the scanned image. The scanned data is temporarily stored in the RAM 23.

In S722, the MFD 20 adjusts scaling of the scanned image generated in the 720 according to the position parameters indicating the coordinates of the rectangular area 334, which were obtained in S518 (see FIG. 6). In this step, the scanned image is enlarged or reduced to fit in a rectangular area defined by the coordinates a (x1, y1), b (x2, y2). The process proceeds to S724.

In S724, the MFD 20 judges as to whether an instruction for color conversion is appended in the print job. In S724, if it is judged that no instruction for color conversion is appended (S724: NO), the process proceeds to S728. If it is judged that an instruction, which was appended in S512 (see FIG. 6), is included (S724: YES), in S726, the MFD 20 converts color information of the scanned data according to the conversion parameters obtained in S512. The process proceeds to S728.

In S728, the MFD 20 judges as to whether a transparency parameter is appended in the print job. If it is judged that no transparency parameter is appended (S728: NO), in S730, the scanned image 250 represented by the data generated in S720 and applied the parameters which were obtained in S722 and S726 is superimposed over the image 200 represented by the printable data being stored in the RAM 23 (see S700). In this step, the image 250 is arranged in the position defined by the position parameters obtained in S518 (FIG. 6). The process proceeds to S734.

In S728, if a transparency parameter is appended to the print job (S728: YES), in S732, the MFD 20 adjust transparency of the data generated in S720 and applied the parameters which were obtained in S722 and S726 according to the transparency parameter obtained in S516 (FIG. 6). Further, the image 250 represented by the transparentized data is superimposed over the image 200 represented by the printable data being stored in the RAM 23 (see S700). In this step, the image 250 is arranged in the position defined by the position parameters obtained in S518 (FIG. 6). The process proceeds to S734.

In S734, the MFD 20 drives the printing unit 28 to form a combined image having the image 200 and the image 250. The process terminates thereafter.

Although an example of carrying out the invention have been described, those skilled in the art will appreciate that there are numerous variations and permutations of the method, system, and apparatus for composite printing that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

What is claimed is:

1. A method to print a composite image in which a first image represented by first data and a second image formed on a recording medium are overlaid, by using a data processing apparatus, capable of generating the first data, and an image forming apparatus, capable of generating the second data which represents the second image and forming the composite image on a recording medium, comprising steps of:

transmitting one of a print instruction concerning a printing operation for the first image and a composition instruction concerning composition of the composite image along with the first data from the data processing apparatus to the image forming apparatus;

receiving the one of the printing instruction and the composition instruction along with the first data from the data processing apparatus in the image forming apparatus;

judging as to whether the composition instruction is received along with the first data;

suspending the printing operation for the first data when it is judged that the composition instruction is received along with the first data;

reading the second image formed on the recording medium when the printing operation for the first data is suspended;

generating the second data based on the read second image;

composing third data representing the composite image by superimposing the second image represented by the second data over the first image represented by the first data; and forming the composite image according to the third data when the third data is composed.

2. The method according to claim 1, further comprising a step of:

setting a configuration of the second data representing the second image to be superimposed over the first image represented by the first data to compose the composite image.

3. The method according to claim 2, wherein the first data can be appended a passcode thereto in the setting process of the configuration of the second data, and wherein the first data can be identified by the passcode upon composition with the second data to compose the third data.

4. The method according to claim 2, wherein the configuration of the second data includes at least one of a superimposed position of the second image within the first image, a composition ratio of the first image and the second image, and a size of the second image with respect to the first image.

5. The method according to claim 1, wherein exclusively the first image is formed according to the first data when it is judged that the print instruction is provided along with the first data.

6. A printing system capable of printing a composite image, in which a first image represented by first data and a second image formed on a recording medium are overlaid, comprising:

a data processing apparatus, capable of generating the first data, and an image forming apparatus, capable of generating the second data which represents the second image and forming the composite image on a recording medium;

wherein the data processing apparatus includes:

a print instruction system to transmit one of a print instruction concerning a printing operation for the first image and a composition instruction concerning composition of the composite image along with the first data to the image forming apparatus; and wherein the image forming apparatus includes:

a printing unit to form an image on a recording medium;

a receiving system to receive the one of the print instruction and the composition instruction along with the first data transmitted from the data processing apparatus;

a reader unit to read the second image formed on the recording medium and generate the second data;

a storage unit to store the second data generated in the reader unit;

a composing system to compose third data representing the composite image by superimposing the second image represented by the second data over the first image represented by the first data;

a judging system to judge as to whether the composition instruction is received along with the first data by the receiving system;

a suspension system to suspend the printing operation for the first data when the judging system judges that the composition instruction is received along with the first data by the receiving system;

a reader unit controlling system to control the reader unit to read the second image to generate the second data when the printing operation for the first image is suspended by the suspension system;

a composition controlling system to control the composition of the third data when the judging system judges that the composition instruction is received along with the first data by the receiving system; and a print controlling system to control the printing unit to form the composite image according to the third data when the composing system composes the third data.

7. The printing system according to claim 6, wherein the data processing apparatus further includes a composite image setting system to set a configuration of the second data representing the second image to be superimposed over the first image represented by the first data to compose the composite image.

8. The printing system according to claim 7, wherein the first data can be appended a passcode thereto in the composite image setting system, and
wherein the first data can be identified by the passcode upon composition with the second data to compose the third data.

9. The printing system according to claim 7, wherein the configuration of the second data to be set by the composite image setting system includes at least one of a superimposed position of the second image within the first image, a composition ratio of the first image and the second image, and a size of the second image with respect to the first image.

10. The printing system according to claim 6, wherein the print controlling system controls the printing unit to form the first image according to the first data when the judging system judges that the receiving system receives the print instruction along with the first data.

11. An image forming apparatus capable of printing a composite image in which a first image represented by first data, generated in an external data processing apparatus, and a second image formed on a recording medium are overlaid, comprising:
a printing unit to form an image on a recording medium;
a receiving system to received the one of the print instruction and the composition instruction along with the first data transmitted from the data processing apparatus;
a reader unit to read the second image formed on the recording medium and generate the second data;
a storage unit to store the second data generated in the reader unit;
a composing system to compose third data representing the composite image by superimposing the second image represented by the second data over the first image represented by the first data;
a judging system to judge as to whether the composition instruction is received along with the first data by the receiving system;
a suspension system to suspend a printing operation for the first data when the judging system judges that the composition instruction is received along with the first data by the receiving system;
a reader unit controlling system to control the reader unit to read the second image to generate the second data when the printing operation for the first image is suspended by the suspension system;
a composition controlling system to control the composition of the third data when the judging system judges that the composition instruction is received along with the first data by the receiving system; and
a print controlling system to control the printing unit to form the composite image according to the third data when the composing system composes the third data.

12. The image forming apparatus according to claim 11, wherein the print controlling system controls the printing unit to form the first image according to the first data when the judging system judges that the receiving system receives the first data and the print instruction.

13. The image forming apparatus according to claim 11, further comprising:
a composite image setting system to set a configuration of the second data representing the second image to be superimposed over the first image represented by the first data to compose the composite image.

14. The image forming apparatus according to claim 13, wherein the first data can be identified by a passcode, which is preliminarily appended to the first data, upon composition with the second data to compose the third data.

15. The image forming apparatus according to claim 13, wherein the configuration of the second data to be set by the composite image setting system includes at least one of a superimposed position of the second image within the first image, a composition ratio of the first image and the second image, and a size of the second image with respect to the first image.

16. A non-transitory computer readable medium storing computer readable instructions to control a printing system including an image forming apparatus to print a composite image, in which a first image represented by first data and a second image formed on a recording medium are overlaid, comprising steps of:
receiving one of a printing instruction and a composition instruction along with the first data from an external data processing apparatus in the image forming apparatus;
judging as to whether the composition instruction is received along with the first data;
suspending the printing operation for the first data when it is judged that the composition instruction is received along with the first data;
reading the second image formed on the recording medium when the printing operation for the first data is suspended;
generating the second data based on the read second image;
composing third data representing the composite image by superimposing the second image represented by the second data over the first image represented by the first data; and
forming the composite image according to the third data when the third data is composed.

17. The non-transitory computer readable medium according to claim 16,
wherein the instructions to control the printing system further include a step of setting a configuration of the second data representing the second image to be superimposed over the first image represented by the first data; and
wherein the configuration of the second data includes at least one of a superimposed position of the second image within the first image, a composition ratio of the first image and the second image, and a size of the second image with respect to the first image.

* * * * *